(12) United States Patent  
Murphy

(10) Patent No.: US 6,711,475 B2
(45) Date of Patent: Mar. 23, 2004

(54) LIGHT DETECTION AND RANGING (LIDAR) MAPPING SYSTEM

(75) Inventor: Kevin E. Murphy, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/937,446

(22) PCT Filed: Mar. 9, 2001

(86) PCT No.: PCT/US01/07540

§ 371 (c)(1),
(2), (4) Date: Sep. 26, 2001

(87) PCT Pub. No.: WO01/69171

PCT Pub. Date: Sep. 20, 2001

(65) Prior Publication Data

US 2003/0036827 A1 Feb. 20, 2003

Related U.S. Application Data

(60) Provisional application No. 60/189,827, filed on Mar. 16, 2000.

(51) Int. Cl.[7] .................................................. G06F 7/00
(52) U.S. Cl. ........................................................ 701/3
(58) Field of Search ............................. 701/1, 3, 205, 701/208, 202, 223

(56) References Cited

U.S. PATENT DOCUMENTS 5,166,789 A  * 11/1992 Myrick ........................ 348/144
5,266,799 A  * 11/1993 Steinitz et al. ............... 250/253
5,528,248 A  *  6/1996 Steiner et al. ............... 342/257

OTHER PUBLICATIONS

W. Jeff Lillycrop, Scanning Hydrographic Operational Airborne Lidar Survey System, IGARSS, May 20–24, 1990.*
Article entitled, "Development and Test of a Raster Scanning Laser Altimeter for High Resolution Airborne Measurements of Topography", by David L. Rabine et al., published May 28, 1996, acticle no. XP 000659607, 0–7803–3068–Apr. 1996$5.00 (c)1996 IEEE, pp. 423–426.
Article entitled, "The Application of Air and Ground Based Laser Mapping Systems to Transmission Line Corridor Surveys", by Morgan D. Reed, P.E., et al., BNSDOCID: <XP_10163309A_1>, 0–7803–3085–Apr. 1996 $5.00(c)1996 IEEE.

* cited by examiner

Primary Examiner—Yonel Beaulieu
(74) Attorney, Agent, or Firm—Francis A. Cooch

(57) ABSTRACT

The present invention is an rapid terrain visualization (RTV) flight management and planning system intended to assist operators of a LIDAR mapping system in planning and conducting aerial surveys. Its primary functions include flight management, survey planning, system control, coverage evaluation, and training. Flight planning capabilities are provided through a survey planner that allows a user to define mission parameters and automatically calculates LIDAR parameters and flight lines. A course deviation indicator (CDI) is provided to the pilot(s) to show both graphically and numerically their perpendicular distance from the current desired flight line. Real-time coverage tracking is provided through a plan progress window that provides a map of the survey area including flight lines. When the aircraft passes through a survey area while the LIDAR is activated, the resulting laser swath traced on the ground is drawn on a plan progress display.

32 Claims, 13 Drawing Sheets

LIDAR Configuration

| | Current | Desired | |
|---|---|---|---|
| Scan Frequency | 26 | 26 | (0 - 100 Hz) |
| Scan Half Angle | 11 | 11 | (0 - 20 deg) |
| Scan PRF | 25 | 25 | (10 - 33 kHz) |
| Eyesafe Altitude | 410 | 410 | (0 - 9999 m) |
| Roll Compensator | 1 | ON | (ON/OFF) |

Load Plan Values | Apply Desired Values | Close

FIG. 17

LIDAR Status

Data Status

| | | |
|---|---|---|
| Ranges | N/A | N/A |
| Intensities | N/A | N/A |
| %Drops | N/A | |

Laser Status

| | |
|---|---|
| Diode Temps | N/A | N/A |
| Diode Currents | N/A | N/A |
| Laser Status | N/A | |
| Scanner Angle | 0 |
| Scanner Average | 0 |
| Scanner Deviation | 0 |

Close

FIG. 18

LIGHT DETECTION AND RANGING (LIDAR) MAPPING SYSTEM

CROSS-REFERENCE TO RELATED APPLICATIONS

This application claims the benefit of prior filed U.S. Provisional Patent Application No. 60/189,827, filed on Mar. 16, 2000 abandoned.

BACKGROUND OF THE INVENTION

The present invention relates to a mapping system and method using Light Detection and Ranging (LIDAR) technology. More specifically, the present invention relates to software that integrates multiple modules and subsystems into a single user-friendly mapping system.

Advancements in Light Detection and Ranging (LIDAR) technology have made it possible to compile digital terrain data from an aircraft platform through laser distance measurements. When integrated with airborne global positioning system (GPS) and inertial measurement systems, LIDAR can capture extremely accurate digital terrain data without GPS land surveys.

Because LIDAR data is captured real-time in an aircraft, digital terrain generation can begin before aerial photography is processed, ground control acquired, and analytic triangulation performed. Once analytic triangulation is finished, final edits and corrections can be performed using photogrammetric methods.

LIDAR works using a scanning laser unit mounted on an aircraft. As the aircraft flies along a line, the laser unit emits a stream of light pulses in a side-to-side motion perpendicular to the aircraft's direction of flight. The time it takes for each pulse to return to the aircraft is recorded along with the angle from nadir at which each pulse was emitted. Airborne GPS data and inertial navigation data provide are also recorded during a mission.

During post processing, the slant distance between the aircraft and the ground for each returned pulse is calculated. Each slant distance is then corrected for atmospheric conditions, and for the roll, pitch and yaw of the aircraft using the inertial navigation data. Typically, GPS data is processed separately and imported into the LIDAR solution where each corrected slant distance is transformed to a ground surface elevation.

LIDAR is extremely accurate. Lower flying altitudes provide a smaller laser spot size or footprint than higher flying altitudes, allowing for more accurate data. Operating altitudes for LIDAR projects typically range from 400 meters to 1,200 meters. Some units have extended capabilities that allow higher operating altitudes.

Horizontal accuracy is typically $\frac{1}{2,000}$th of the flying height. Vertical accuracy is better than 15 centimeters when the operating altitude is 1,200 meters or below, and up to 25 centimeters when the operating altitude ranges from 1,200 meters to 2,500 meters.

A significant factor in the digital terrain model accuracy is the airborne GPS data. If flight plans are optimized for GPS, then vertical accuracies of 7 to 8 centimeters can be routinely achieved. Other rules of thumb related to accuracy include:

The slower the aircraft, the denser the spot spacing.
The denser the spot spacing, the more reliable the digital terrain model (more data yields better accuracy).
Laser spots at nadir are more accurate than spots at the outside edge of the swath, or field of view.
The narrower the swath, the faster the scan rate; thus, denser data will be produced for a given pulse repetition rate and aircraft speed.

LIDAR allows generation of digital terrain models in areas with hills, heavy vegetation, or shadows. This often eliminates the need for survey crews to return to the field to capture points that could not be compiled photogrammetrically.

Points can even be captured with LIDAR where ground access is limited such as in high-security installations. Likewise, it can be used for hydrochannel mapping, shoreline mapping, and for obstruction analysis mapping for airports. Also, LIDAR is useful for mapping areas with poles and towers and to obtain the elevations of power lines (these cannot be acquired using conventional photogrammetric methods).

LIDAR is a complicated data intensive system that requires the integration of multiple data components in order to achieve accurate results. In order to generate maps based on LIDAR, data from the LIDAR laser module itself must be collected along with GPS and inertial navigation data.

What is needed is a system that integrates many of the data intensive modules that comprise a LIDAR mapping mission as well as a system that provides flight planning and real-time flight path feedback data to the pilot of the aircraft. The flight planning and flight path feedback elements allow for more efficient, accurate, and robust LIDAR mapping missions by continuously informing pilot(s) of any detected course deviations with respect to the desired flight path.

SUMMARY OF THE INVENTION

The present invention is a rapid terrain visualization-navigation (RTV-NAV) flight management and planning system and software package intended to assist an operator of a LIDAR module in planning and conducting aerial mapping surveys. The core RTV-NAV functions include flight management, survey planning, LIDAR module control, coverage evaluation, and training.

The primary RTV-NAV software display control interface includes various instrument control frames and a large navigation map. The navigation map displays current aircraft position, a trace of aircraft movement for the past few minutes, a survey grid, and a configurable map background. The navigation map can be panned and zoomed at will by the operator. The map background comprises any combination of USGS vector maps, user-definable navigation points, and pre-rendered images including graphics interchange format (GIF) images, joint photographic experts group (JPEG) images, and bitmap (BMP) images.

Real-time GPS data is acquired by listening to Ethernet broadcasts from a position and orientation system/airborne vehicle (POS/AV) inertial navigation unit built into the LIDAR module. Remote computer control of the LIDAR module is provided through a serial link between the LIDAR module and a computer running the RTV-NAV software. The serial link allows the operator to turn the LIDAR laser on and off, reconfigure the laser scan angle or scan frequency, and eject a data tape.

Flight planning capabilities are provided through a survey planner. The survey planner subsystem allows the operator to define mission parameters such as survey area, desired resolution, altitude, and aircraft velocity. The survey planner automatically calculates the necessary LIDAR parameters and flight lines. The survey area may be defined either by entering coordinates, by drawing polygons on the navigation map, or by importing coordinates from a text file.

A course deviation indicator (CDI) is provided to the pilot(s) by use of a dual-display video card. One display, containing the primary RTV-NAV operator interface, is shown to the system operator while the other is dedicated to the CDI. This second display is then typically scan-converted to video and fed to a cockpit television or flight management system (FMS). The CDI is a real-time instrument capable of showing the pilot(s) both graphically and numerically the aircraft's perpendicular distance from the current desired flight line. The CDI also provides course and distance-along-line information, as well as a LIDAR on/off indicator. Finally, the CDI includes a crude mini-map representation of the aircraft position with respect to the flight line for gross situational awareness.

Real-time coverage tracking is provided through a plan progress window that provides a map of the survey area including flight lines. When the aircraft passes through the planned survey area while the LIDAR is activated, the resulting laser swath traced on the ground is drawn on a plan progress display. This swath is determined from the real time GPS position and inertial orientation data provided by the POS/AV inertial navigation unit, and the LIDAR ranges. If the GPS data is good, as defined by several GPS quality indicators, the swath will be drawn in green. If the GPS data is questionable, the swath will be drawn in red. As multiple lines are flown, coverage gaps between lines can easily be seen, and additional lines may be flown to fill them. The information necessary to later reconstruct these swaths is stored.

During a flight, the system operator loads a pre-made flight plan, and uses the primary RTV-NAV control interface to select flight lines for the pilots as the flight progresses. The pilot CDI display will automatically be set to the flight line selected by the system operator. As the resulting area coverage is drawn on the plan progress display, new flight lines are chosen to either cover new flight lines or fill in gaps between previous flight lines as necessary. The RTV-NAV software control interface is used to turn off the LIDAR module while the aircraft is turning around, and to re-activate the LIDAR module when a new flight line is begun. The RTV-NAV system also maintains an automated log of all LIDAR module settings, flight lines, GPS problems, and operator.

BRIEF DESCRIPTION OF THE DRAWINGS

FIG. 17 illustrates the Configure RTV window.

FIG. 18 illustrates the Monitor RTV window.

DESCRIPTION OF THE PREFERRED EMBODIMENTS

Figure 1:
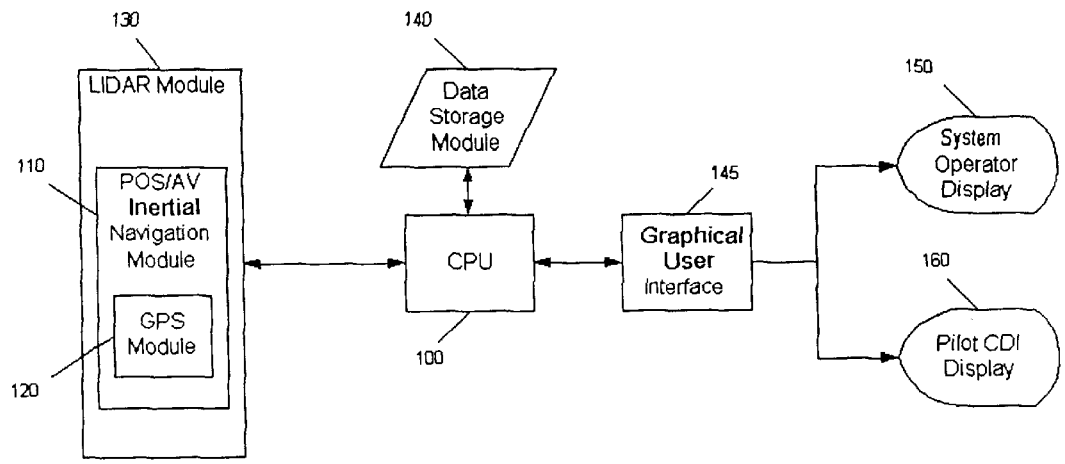
FIG. 1 illustrates a block diagram of the elements that comprise the RTV-NAV system of the present invention.

One embodiment of the present invention is a computer readable medium whose contents transform a computer system into an aerial survey system. The aerial survey system includes a survey planner subsystem for generating an aerial survey flight plan, a flight management subsystem for monitoring and controlling a GPS data module, an inertial navigation module, and a LIDAR module, a coverage evaluation subsystem for monitoring the progress of an aerial survey flight, and a graphical user interface subsystem for controlling the survey planner subsystem, the flight management subsystem, and the coverage evaluation subsystem. The graphical user interface subsystem is viewable on a system display.

An aerial survey flight plan includes a survey area, a survey resolution, and a flight profile, where the flight profile includes a set of flight lines, a survey flight altitude, a survey flight velocity, an overlap value, and a turn time. The survey planner subsystem can also be used to alter a flight plan during a flight using the graphical user interface subsystem.

The coverage evaluation subsystem highlights successfully covered areas and unsuccessfully covered areas of a survey area on the system display in real-time during the flight. Moreover, the flight management subsystem can program a new flight line into the flight plan during a flight in order to cover areas that were previously unsuccessfully covered.

The aerial survey system also includes a calibration flight planning subsystem for calibrating the LIDAR module.

The graphical user interface subsystem is a menu driven windows based software program that includes a primary control interface window comprised of a menu bar that is used to navigate among and select program options, a control panel that is used to monitor and control system parameters, and a navigation map that is used to view the current flight plan. System parameters include GPS data, inertial navigation data, LIDAR control data, and flight plan data. The plan progress display is another window accessible from the graphical user interface subsystem. The plan progress display window is used to highlight successfully covered areas and unsuccessfully covered areas of a survey area on the system display in real-time.

In accordance with another embodiment of the invention is a computer system for planning an aerial survey that includes a computer running a windows based menu-driven graphical user interface. The graphical user interface is responsive to operator input and is used to generate a flight plan for surveying a designated area. The computer system also includes data storage means for storing said flight plan. The data storage means can be removable from the computer system and operable with other computer systems. In one example, the data storage means can be a removable compact disk that can store a flight plan and can transfer said flight plan to another computer system. In another example, the data storage means can be a removable floppy disk that can store a flight plan and can transfer said flight plan to another computer system. In yet another example, the data storage means is a removable zip disk that can store a flight plan and can transfer said flight plan to another computer system. The data storage means are not limited, however, to those enumerated above. One of ordinary skill in the art can readily substitute different types of data storage means without departing from the spirit or scope of the present invention. Moreover, the flight plan can be transferred to another computer system via a network connection.

In accordance with yet another embodiment of the invention is a computer system for planning and conducting an aerial survey. The computer system includes an aircraft mountable rapid terrain visualization module comprised of inertial navigation measuring equipment for measuring aircraft flight data, GPS data equipment for measuring aircraft position data, and LIDAR equipment for tracing a laser swath over a specified area of terrain in order to obtain geographical information for said specified area. The computer system also includes a computer operably connectable with the aircraft mountable rapid terrain visualization module such that the computer receives data from said rapid terrain visualization module.

The computer system is connectable with a display and data storage means such that data received from the rapid terrain visualization module can be viewed in real-time and stored in for subsequent analysis and post processing. Moreover, the computer can be disconnected from the rapid terrain visualization module once data has been received and stored.

The computer runs a windows based menu-driven graphical user interface to control the system as a whole. The graphical user interface includes a primary control interface window comprised of a menu bar that is used to navigate among and select program options, a control panel that is used to monitor system parameters, and a navigation map that is used to view the current flight plan. The computer can, for instance, switch said LIDAR equipment on and off via the graphical user interface.

The computer is also connectable with an aircraft cockpit display. The aircraft cockpit display shows, with respect to the flight plan, course deviation data to a pilot during a flight. The data on this display assists the pilot in navigating the aircraft according to the flight plan. The course deviation data shown on the aircraft cockpit display is controllable by the graphical user interface.

The graphical user interface can also launch a plan progress display window that is used to highlight successfully covered areas and unsuccessfully covered areas of a survey area on said system display in real-time during a flight. The plan progress display is used primarily to alter the flight plan during a flight in response to unsuccessfully covered areas highlighted on said plan progress display. For example, a system operator can add new flight lines to the flight plan in order to cover previously unsuccessfully covered areas.

FIG. 1 illustrates a block diagram of the elements that comprise the RTV-NAV system of the present invention. A central processing unit (CPU) 100 functions as the focal point for data gathering and data processing. The CPU 100 can be housed in any number of computing devices including, but not limited to, a personal computer, a laptop or notebook computer, or any other special purpose device. The CPU 100 is operatively connected with several modules that gather pertinent information necessary to carry out an aerial survey. These devices include a POS/AV inertial navigation module 110 that provides aircraft altitude, pitch, roll, and yaw data, and a LIDAR module 130 that operates the laser mechanism. The POS/AV inertial navigation module 110 includes a GPS Data module 120 for obtaining precise geographical location data. The POS/AV inertial navigation module 110 is housed within the LIDAR module 130. The CPU 100 is also operatively connected with a data storage module 140. The data storage module 140 serves as a repository for flight plan data, data gathered during a flight mission from the GPS 120, POS/AV Inertial Navigation Unit 110, and LIDAR 130 modules, and flight log data. The data storage module 140 need not be limited to a single entity that stores all mission data. Various mission data may be stored over a variety of memory devices all accessible to the CPU 100.

The data gathering modules of the system all feed into the CPU 100. The CPU 100 is also programmed with software that organizes and processes all of the data and presents it to a system operator via a graphical user interface (GUI) 145. GUI 145 is the aspect of the system that provides the operator with the ability to control the system for pre-flight planning, in-flight data gathering, and post-flight processing. The GUI 145 integrates most mission functions into a single software interface thus making the task of aerial surveying using LIDAR much less complex.

Flight plan data includes the coordinates that define the area of land to be mapped, the proposed altitude the mission will be flown at, a pre-determined set of flight paths required to cover the chosen area of land, etc. Data gathered during a flight mission typically includes GPS module 120 data, POS/AV inertial navigation module 110 data, and LIDAR module 130 data acquired during a mission. Flight log data includes extrinsic data captured during a mission such as weather conditions, temperature, visibility, wind speed and direction, system error messages, flight date and time data, and operator comments.

The system also includes a pair of video display units for displaying data during a mission. The first display unit 150 is for use by the system operator and uses a dual display video card in order to provide two windows, the primary control interface display and the plan progress display, to the system operator. The second display unit 160 is located in the cockpit of the aircraft and is for use by the pilot(s). It contains CDI data that is typically scan converted to video for display in the cockpit environment.

Figure 2:
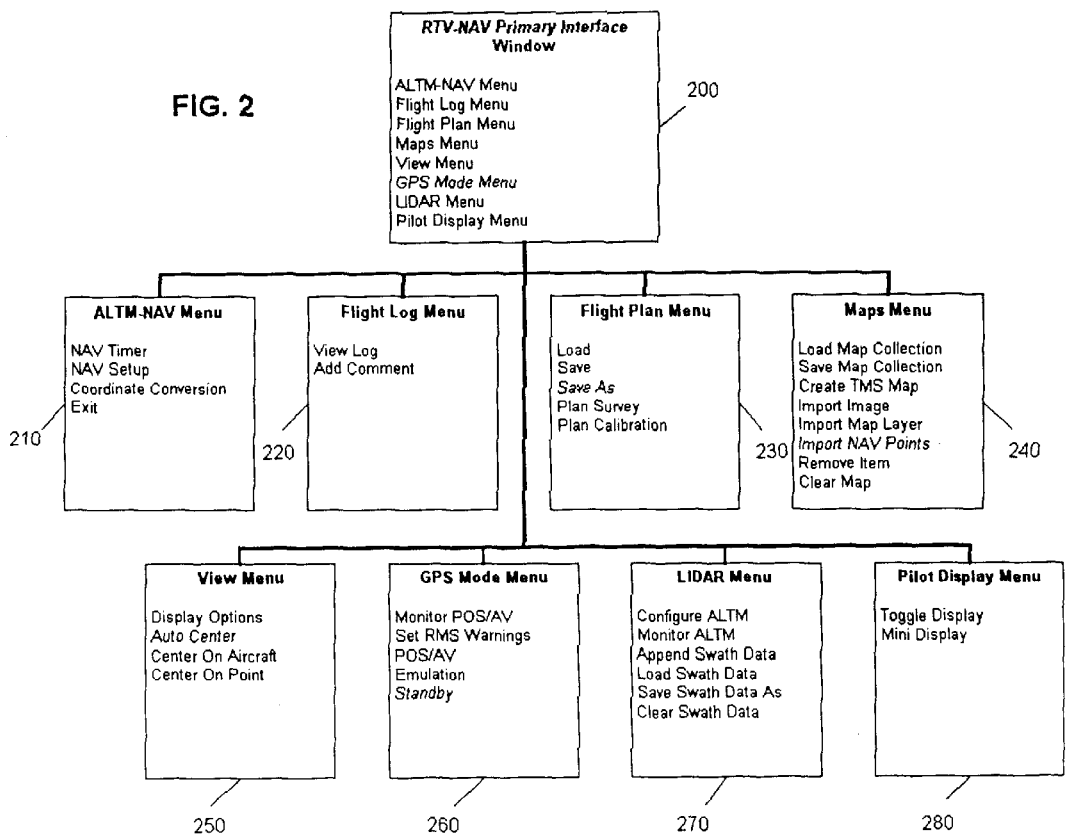
FIG. 2 illustrates a menu hierarchy for the primary RTV-NAV control interface.
Figure 3:
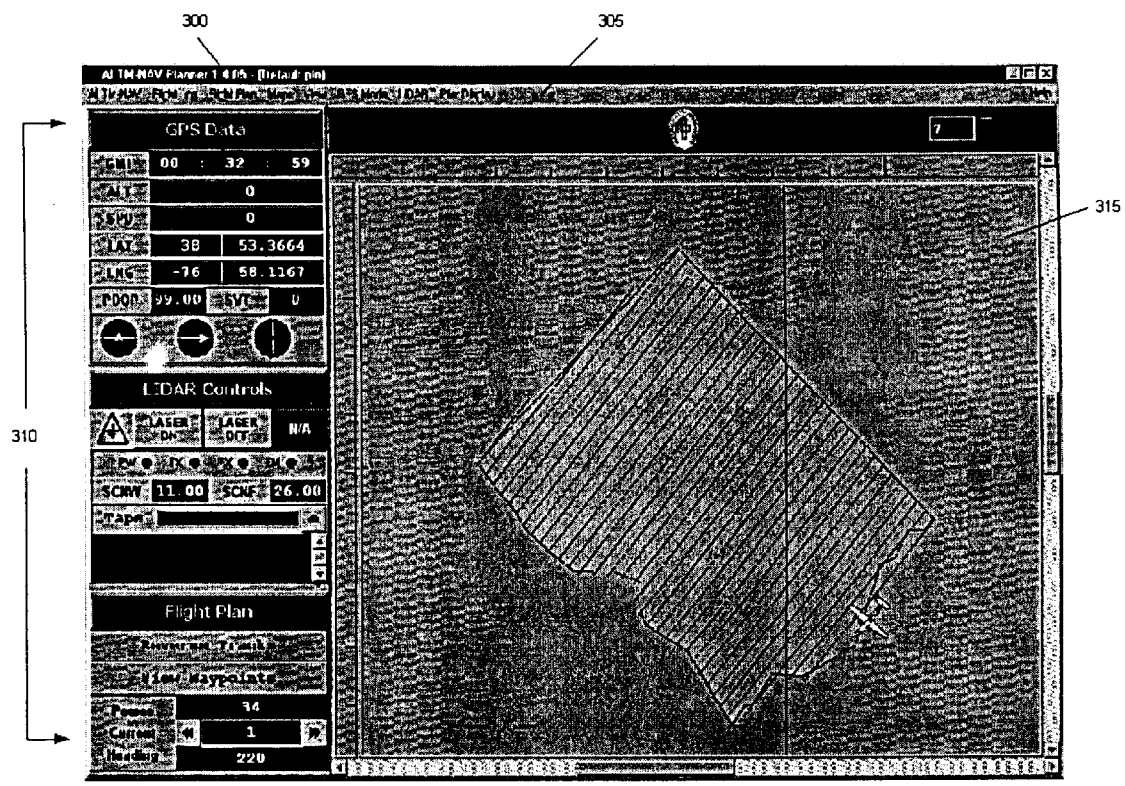
FIG. 3 illustrates the primary RTV-NAV control interface display window.

FIG. 2 illustrates a menu hierarchy for the RTV-NAV software running on the CPU. The RTV-NAV primary control interface is the starting point for a system operator when the RTV-NAV program is executed. The primary control interface window, illustrated in FIG. 3, provides a menu bar 305 for accessing different parts of the RTV-NAV system, a set of instrument controls 310, and a navigation map 315. Box 200 of FIG. 2 lists the menus available on the primary control interface window. Each of these menus is selectable by placing a cursor over the desired menu and left-clicking. This action will reveal a pull down listing of the available selections for that menu. Simply move the cursor to the desired menu selection and left-click to launch that particular menu selection.

The menus listed in box 200 include the ALTM-NAV menu 210, the Flight Log menu 220, the Flight Plan menu 230, the Maps Menu 240, the View menu 250, the GPS Mode menu 260, the LIDAR menu 270, and the Pilot Display menu 280 as well as a "help" button. ALTM is an acronym meaning Airborne Laser Terrain Mapper and generally refers to the LIDAR module.

Figure 4:
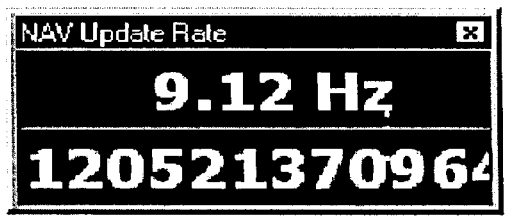
FIG. 4 illustrates the NAV Timer window.
Figure 5:
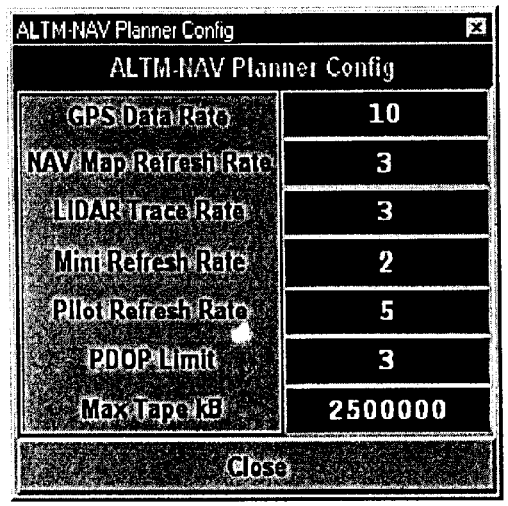
FIG. 5 illustrates the NAV Setup window
Figure 6:
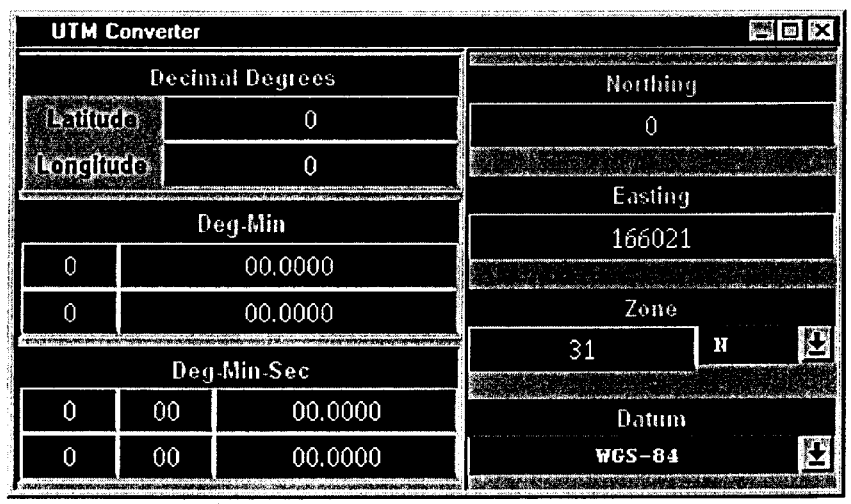
FIG. 6 illustrates the Coordinate Conversion window

The selections available under the ALTM-NAV menu 210 include NAV Timer, NAV Setup, Coordinate Conversion, and Exit. Selecting NAV Timer creates a real-time display of the current GPS data and LIDAR update rates. The RTV-NAV software defaults to receive GPS updates at 50 Hz, and LIDAR updates at ~1 Hz. RTV-NAV's maximum meaningful update rate is thus 50 Hz. The NAV Timer display is shown in FIG. 4. Selecting NAV Setup creates an editable display in which an operator may edit update rate settings for various components of the system. The NAV Setup display is shown in FIG. 5. Selecting Coordinate Conversion creates a display in which coordinates in various coordinate systems may be converted from one coordinate system to another. The Coordinate Conversion display is shown in FIG. 6. Selecting Exit from the RTV-NAV menu will shut down the system and close the display windows.

Figure 7:
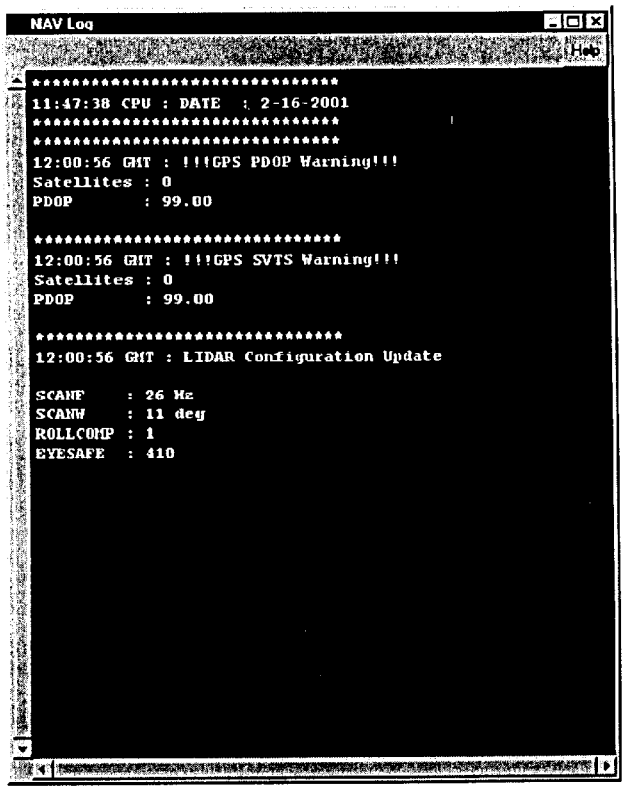
FIG. 7 illustrates the View Log window.
Figure 8:
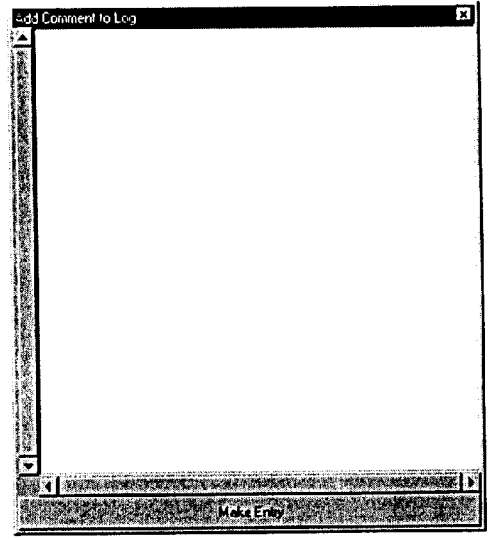
FIG. 8 illustrates the Add Comment window

The selections available under the Flight Log menu 220 include View Log and Add Comment. RTV-NAV automatically maintains flight logs whenever operational. Every time RTV-NAV is started, it opens a new file. It then opens a dialog box requesting that the operator enter weather and mission parameters for the log header. It will thereafter automatically place GPS time-tagged comments for several events. The flight log may be viewed at any time by selecting View Log. A sample flight log window is shown in FIG. 7. In addition, time-tagged comments may be added to the flight log at any time by either selecting Add Comment or by pressing Control-A. This will open a text-entry window. A sample Add Comment text-entry window is shown in FIG. 8. From here the operator types comments, and then presses either Make Entry or Control-D to enter them to enter them in the flight log and close the Add Comment text window.

The selections available under the Flight Plan menu 230 include Load, Save, Save As, Plan Survey, and Plan Calibration. Clicking on Load opens a standard windows dialogue box of a directory and files. The files displayed are saved flight plans. Clicking on Save automatically saves the current flight plan. Clicking on Save As, however, opens a standard dialogue box of a windows directory. Save As allows the operator the option of re-naming the flight plan without overwriting the original flight plan.

Figure 9:
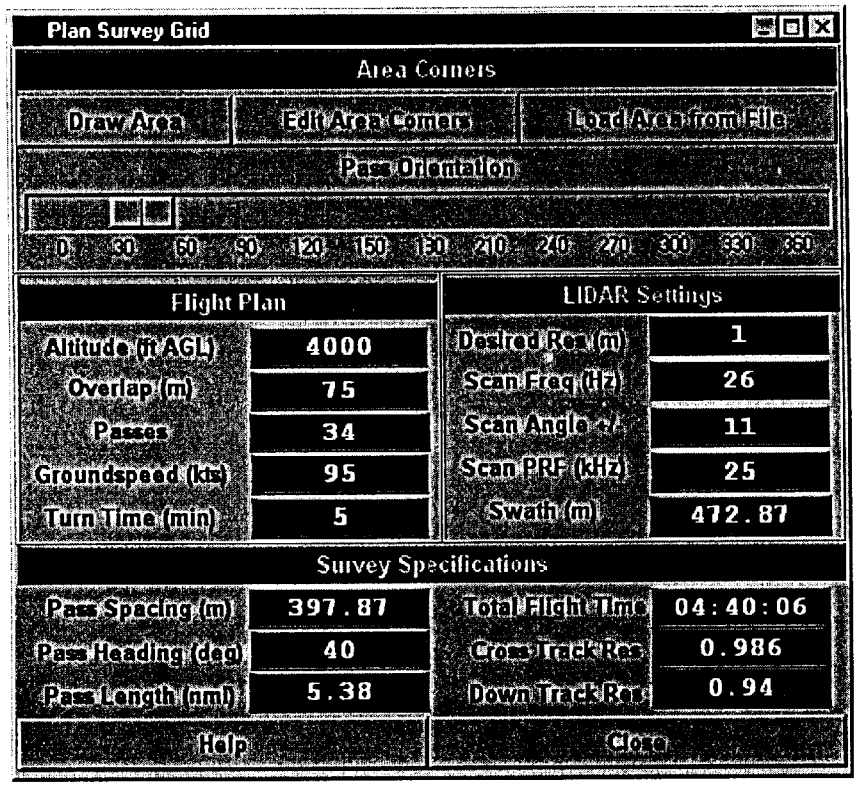
FIG. 9 illustrates the Plan Survey window.

Flight plans are created using the survey planner subsystem by selecting the Plan Survey option on the Flight Plan menu. The survey planner window, shown in FIG. 9, allows an operator to plan a survey by defining an area, a desired resolution, and a flight profile. Upon opening the survey planner, a survey area must be defined. This may be done either graphically on the navigation map or manually by creating and importing a text file or by defining the area corners. To define a survey area graphically, first click the Draw Area button in the survey planner. Then, left-click on the main navigation map once for each desired area corner—in either clockwise or counter-clockwise order. When all desired corners have been defined, click the Draw Area button in the planner again or double-click on the last corner to complete the survey area. A set of flight lines will appear mapping the new area.

To define an area numerically, click the Edit Area Corners button in the survey planner. This will open a window allowing you to type in latitude/longitude coordinates. Use the arrow buttons at the top of the window to scroll through the currently defined corners, and edit them as desired. Use the Add, Remove, and Insert buttons to add or remove corners from the defined list. The navigation map will be automatically updated whenever changes are made in this manner.

To import coordinates from a file, open a new text file using any text editor and create a file conforming to the following format:

File Line 1: Number of Corners
File Line 2: Coordinate Format (D, DM, DMS, or UTM)
File Line 3: Spheroid Datum (WGS-84, etc.—line ignored unless UTM)
File Line 4: UTM Region (e.g. "18 S"—line ignored unless UTM)
File Line 5: Latitude of Corner 1 or UTM Y1
File Line 6: Longitude of Corner or UTM X1
File Line 7: Latitude of Corner 2 or UTM Y2
File Line 8: Longitude of Corner 2 or UTM X2
Etc . . . .

Once the text file has been created, select Load Area from File to select the new text file and import the area coordinates. As shown above, points may be entered in either DD.DD, DD MM.MM, DD MM SS.SS, or UTM format. Several UTM formats are supported including the following Spheroid Datums: Airy, Australian National, Bessel 1841, Bessel 1841 Nambia), Clarke 1866, Clarke 1880, Everest, Fischer 1960 (Mercury), Fischer 1968, GRS 1967, GRS 1980, Helmert 1906, Hough, International, Krassovsky, Modified Airy, Modified Everest, Modified Fischer 1960, South American 1969, WGS-60, WGS-66, WGS-72, and WGS-84.

The area corners may be edited after they have been defined by pressing the Edit Area Corners button in the flight planner. This will create a small window enabling the operator to manually scroll through and edit the defined area coordinates. The operator may also graphically edit corners. First, click on a desired corner on the navigation map. This will turn the corner red. Then, left-click and drag the corner to the new desired position. To delete a corner, select it and then click the Delete button in the edit box. To insert a corner, select the corner next to it and click the Insert button in the edit box. This will create an additional corner on top of the currently selected corner. Then, either manually change the coordinate values or click-and-drag the new corner to the desired position.

Next, the pass orientation must be defined. Click-and-drag the orientation slider in the survey planner to set the desired orientation. The flight lines on the navigation map and plan progress window and the flight time calculated by the survey planner will be automatically updated as the slider is moved. Unless outside circumstances necessitate a sub-optimal pass orientation, the orientation, which minimizes the flight time, is most likely desired.

Once the survey area and orientation have been defined, enter the desired data resolution and flight profile. Only values colored white in the survey planner need be entered; values colored cyan are calculated automatically. As values are entered, RTV-NAV automatically updates the survey plan to accommodate the new values. Alternatively, the scan width (SCNW) and scan frequency (SCNF) may be entered, and the resolution will be calculated. If this is done, the scan width and scan frequency will be shown in white, while the desired resolution will turn cyan. Once the survey plan has been completely defined, save it to both the hard disk of the computer being used for flight planning and a floppy disk for transfer to the flight computer. This can be done using the Save option from the Flight Plan menu.

The majority of the values in the survey planner are self-explanatory, but a few may require additional explanation. The overlap value defines the amount by which one LIDAR swath will overlap the next. It serves as a safety margin for GPS error and directly defines the pilot's margin for error. This value should never be set to zero, because that would require perfect precision from both the GPS and the pilots. A more reasonable value, as determined by field experience, would be 30 to 50 m. The turn time value indicates the likely time for the aircraft to turn around 180 degrees and get back on track after each successive flight line.

Calibration flights are handled differently than survey flights and are planned using a calibration flight planner. When a calibration flight is planned, an appropriate calibration building must first be identified and surveyed. This building should be relatively large (at least 100 m), with a flat roof. Once the building has been surveyed, two flight plans should be generated using RTV-NAV's Calibration Flight Planner—one for profile mode and the other for scanning mode.

Before opening the calibration flight planner, the operator creates a text file, using any ASCII text editor, defining the building coordinates. This file should be in the same format as those used by the survey planner.

Figure 10:
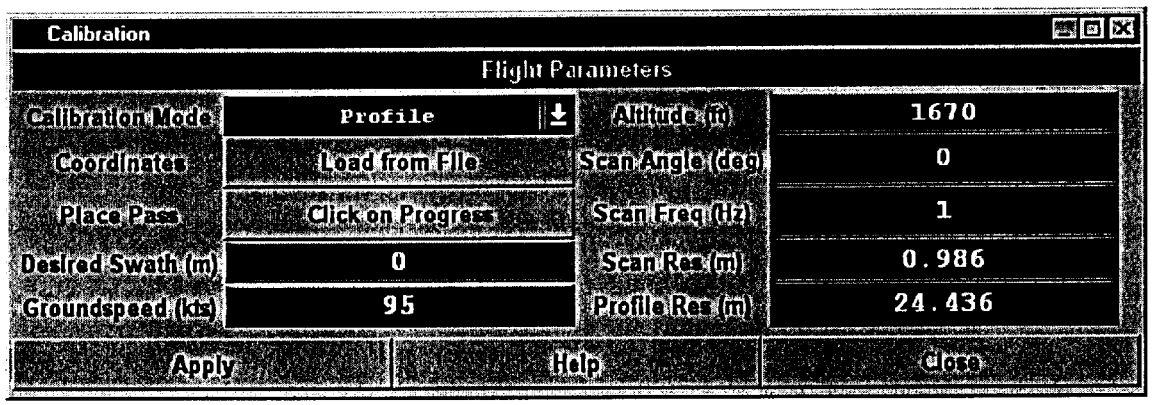
FIG. 10 illustrates the Plan Calibration window

The operator then opens the calibration planner by selecting Plan Calibration from the Flight Plan menu. The plan calibration window is illustrated in FIG. 10. The operator clicks Load from File to select the text coordinate file created above. The navigation map view will jump to the equator, as no flight line has been defined. Next, the operator sets the calibration mode to profile. In profile mode, the LIDAR is not scanned. This enables pitch offsets in the LIDAR installation to be seen more easily when passes a re flown over the surveyed building. Because the laser is not scanning in this mode, it is necessary to fly above the non-scanning eye-safe altitude of 2194 m. The calibration planner will default to a value 100 m above the limit to give a cushion for objects that may stick out above ground level and activate a laser safety cutoff. During actual operations, it may prove necessary to fly even higher if the cutoff switch is consistently activated by local terrain features. The operator then selects Click on Progress to define a flight line. A plan progress window will automatically be brought to the fore. Left-click once to define each end of the desired flight line. For the profile mode, the flight line should be selected such that the aircraft passes down the middle of the building, perpendicular to its widest side. This will maximize the chances that the aircraft will hit the building when making passes at high altitude.

Set the estimated groundspeed as appropriate, and briefly check the resulting resolutions. The listed profile resolution should be quite low (the actual value is not particularly important), because the laser is not scanning at all, and the distance between spots on the ground will be determined solely by the groundspeed of the aircraft and the Pulse Repetition Frequency (PRF) of the LIDAR. The scan resolution is effectively meaningless in this mode. Finally, save the plan as the profile plan.

Now set the calibration mode to scan. This mode is used to determine the roll offset and scale factor of the LIDAR installation. Because the laser is scanning normally in this mode, the flight altitude is set by default to 100 m above the specified scanning limit of 1212 meters above ground level (AGL). Once again, set the estimated aircraft groundspeed and check the calculated resolution. The scan resolution should be on the order of 10 cm, whereas the profile resolution should be near 10 m. Define the flight line as before, but this time orient the flight line down the center of the narrowest edge of the building. This will maximize the number of times the now slowly scanning laser will cross the edge of the building during each flight pass. Once the flight line has been chosen, save the plan as the scanning plan.

The selections available under the Maps menu 240 include Load Map Collection, Save Map Collection, Create TMS Map, Import Image, Import Map Layer, Import NAV Points, Remove Item, and Clear Map. GPS land maps may be projected onto the navigation map to enhance situational awareness. These maps are obtained from a USGS database, and allow features such as landmass, rivers, and roads to be projected for various US States and Countries. Map layers are color-coded by type, and may be imported individually from the Maps menu by selecting Import Map Layer. Similarly, navigation points may be mapped onto the display and can be imported from the Maps menu by selecting Import Nav Points.

Externally generated pictures depicting maps may also be projected onto the navigation map from the Maps menu by selecting the Import Image menu item. An image file must be selected, and then control points are defined to properly position and scale the image. After selecting an image, a window will open showing the prospective image, with two data lines for entering control points. Click on the button marked Point 1, then left-click and drag to place the point on the image. Define a latitude/longitude position for the point in the boxes below. Repeat the procedure for Point 2, and then click Import to import the image into the navigation map. Once these control points have been provided they will be remembered, and need not be entered again the next time the image is imported. When zooming the navigation map, any projected images will automatically be cropped to a maximum size of 1024×768. If the current zoom level would necessitate a larger image, the 1024×768 portion of the zoomed image closest to the current map center will be shown.

Figure 11:
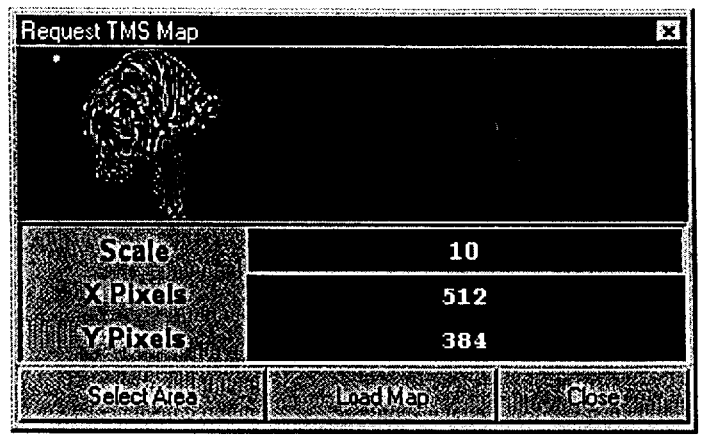
FIG. 11 illustrates the Create TMS Map window

Maps may also be downloaded from the US Census Bureau's online Tiger Map Service (TMS) from the Maps menu by selecting Create TMS Map. The window shown in FIG. 11 will appear. First, an area must be selected on the navigation map. Click the Select Area button and then click and drag the cursor on the main map to select an area. Adjust the scale until the image size looks reasonable (not significantly greater than 1024×768), and click Load Map to request and download the map from TMS. Once the map has been downloaded, a file name will be requested, and then the new image will be projected onto the RTV-NAV operator display unit.

The current combination of USGS Layers, NAV Points, and Images may be saved by selecting Save Map Collection from the Maps menu. Similarly, a previously saved map configuration may be loaded en masse by selecting Load Map Collection from the Maps menu, rather than importing all of the items individually. Any map layer, image, or NAV point file may be removed from the display by selecting Remove Item from the Maps menu while all items may be removed from a map by selecting Clear Map from the Maps menu.

Figure 12:
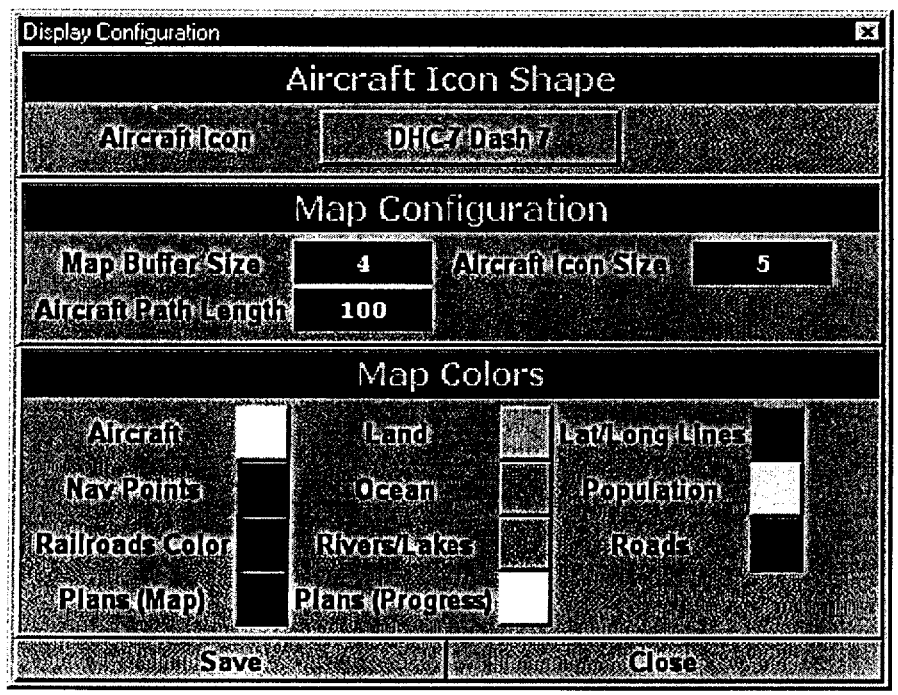
FIG. 12 illustrates the Display Options window.
Figure 13:
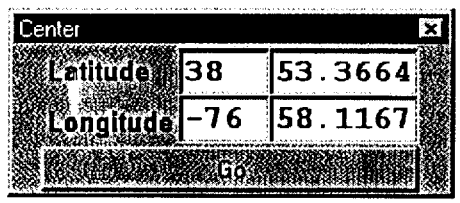
FIG. 13 illustrates the Center On Point window.

The selections available under the View menu 250 include Display Options, Auto Center, Center on Aircraft, and Center on Point. These options allow the user to change the geographical area displayed in the navigation map. The Display Options selection opens the window shown in FIG. 12—allowing the user to alter several display colors, icon sizes, and the icon representing the aircraft. Center on Aircraft centers the map on the current location of the aircraft. Center on Point opens the window shown in FIG. 13—allowing the user to enter a latitude/longitude point on which to center the map. The Auto-Center option operates as a toggle switch determining whether the map will automatically scroll with the aircraft during flight. Pressing <F5> will manually re-center the navigation map.

Figure 14:
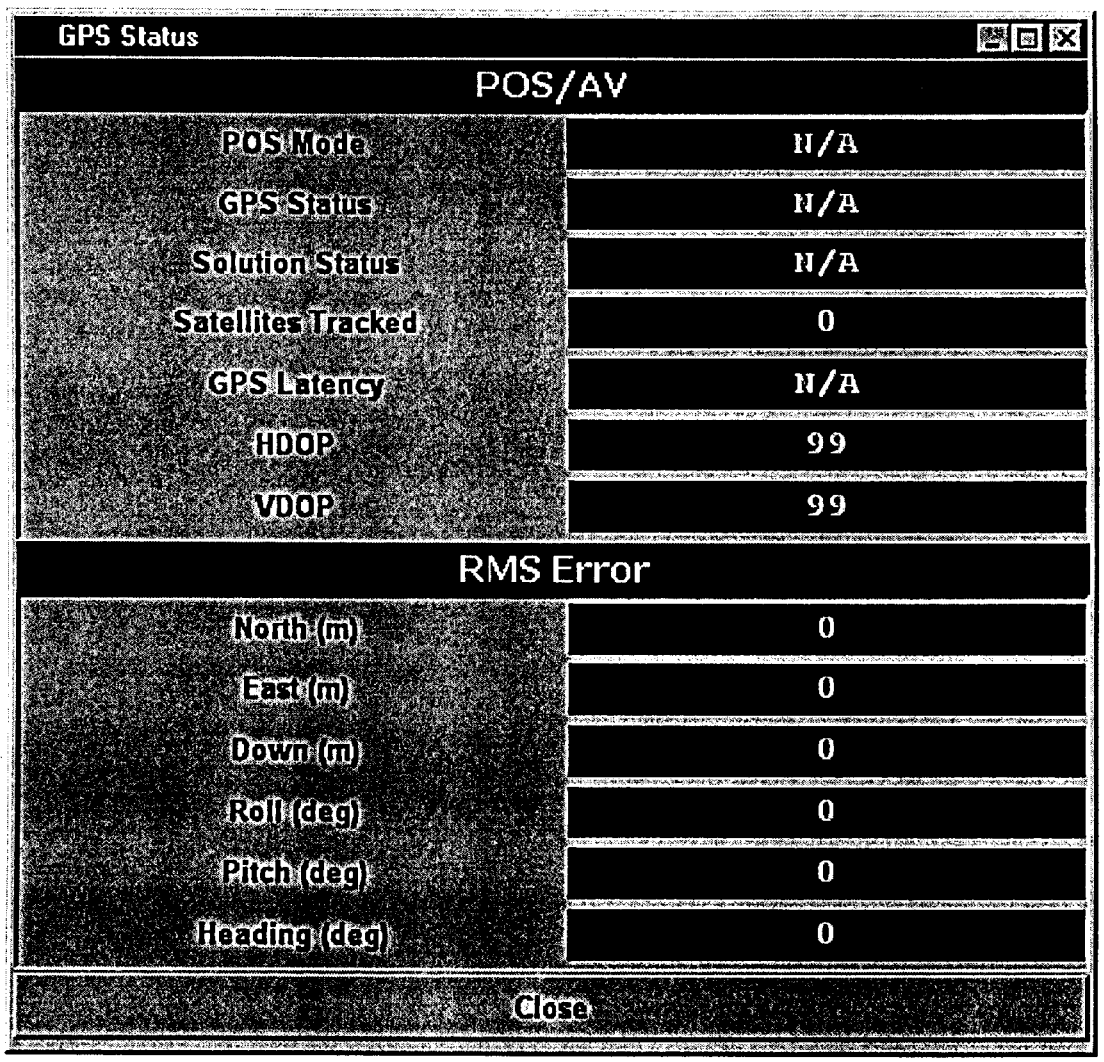
FIG. 14 illustrates the Monitor POS/AV window.
Figure 15:
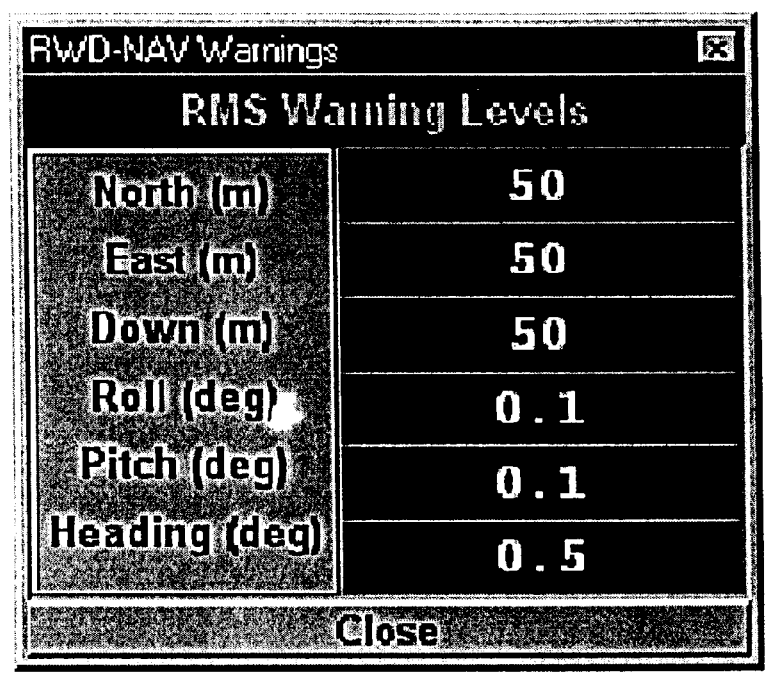
FIG. 15 illustrates the Set RMS Warnings window.

The selections available under the GPS Mode menu 260 include Monitor POS/AV, Set RMS Warnings, POS/AV, Emulation, and Standby. Selecting Monitor POS/AV from the GPS Mode menu creates a GPS Status window as shown in FIG. 14. Various GPS status indicators are displayed that give an indication as to the reliability of the current GPS data. Selecting Set RMS Warnings from the GPS Mode menu creates an RMS warning level window as shown in FIG. 15. This window displays the NAV software current warning thresholds for each GPS and inertial variable. If the error levels for any of these variables reported by the POS/AV unit exceeds a threshold, the corresponding value in the main interface will be displayed in yellow-on-red instead of the normal cyan-on-black.

Figure 16:
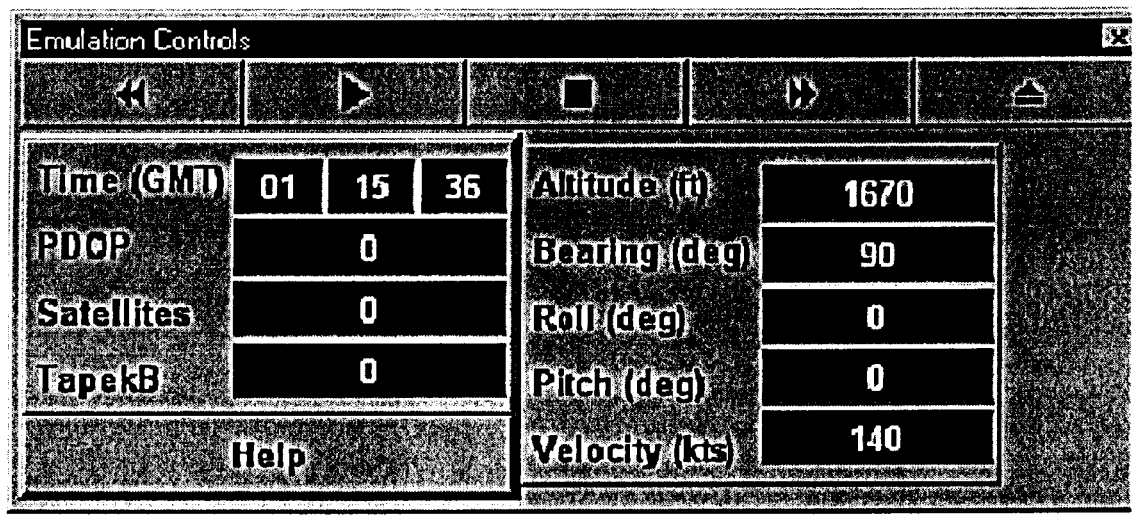
FIG. 16 illustrates the Emulation window.

The NAV software may operate in any one of three operational modes: POS/AV, Emulation, and Standby. In POS/AV mode, aircraft position and orientation and time passage information is derived from the POS/AV Ethernet link. In Emulation mode these same values are derived from a VCR simulator window as shown in FIG. 16. In Standby mode, no real-time data is obtained and the software only responds to user input.

Selecting Emulation from the GPS Mode menu simulates a connection to functioning GPS and LIDAR modules by creating a window resembling a VCR as shown in FIG. 16. Clicking the Play button will simulate aircraft motion. The aircraft will start moving north, and the GPS readouts in the upper left portion of the primary control interface window (FIG. 3) will begin changing accordingly. New values may be entered in the Altitude, Velocity, and Bearing fields of the emulation control window at any time, and they will immediately take effect. Clicking Rewind will reverse time while clicking Fast Forward will increase the speed of time flow.

The selections available under the LIDAR menu 270 include Configure ALTM, Monitor ALTM, Append Swath Data, Load Swath Data, Save Swath Data As, and Clear Swath Data. The LIDAR may be re-configured by either selecting Configure ALTM from the LIDAR menu or clicking on the LIDAR Controls header in the control panel of the primary control interface window. This will open a window, as shown in FIG. 17, enabling the operator to enter new values for the scan width, scan frequency, or roll-compensation. Once these have been set as desired, the user selects Apply Desired Values to configure the LIDAR. In order to load the values called for in the current flight plan, click Load Plan Values to summon the values and click Apply Desired Values to set the LIDAR.

The performance of the LIDAR may be monitored by selecting Monitor ALTM from the LIDAR menu. This will open a window, as shown in FIG. 18, detailing the status of the LIDAR data and the laser. The LIDAR data displayed in this window will be an essentially random sample of the data stream from the laser sensor.

During real-time operation RTV-NAV receives LIDAR status information from the LIDAR module at ~1 Hz. This connection should be initiated automatically when RTV-NAV is started. As long as LIDAR data is being received, a red light will be shown in the status bar of the main interface (at the top left of the header above the navigation map). If this light is not showing, it may be necessary to re-initiate the LIDAR connection.

The selections available under the Pilot Display menu 280 include Toggle Display and Mini Display. RTV-NAV manages a video display on the pilot monitor to enable the pilot(s) to accurately fly survey lines. This display is generated by taking advantage of a dual-display video card. This video card essentially generates a windows desktop that is twice as wide as normal, with the left half being displayed on the RTV-NAV computer and the right half being converted to video for display on the pilot monitor. The pilot display is then automatically placed on the right half of the windows desktop, while the left is reserved for the operator interface. The course deviation indicator (CDI) display is activated by selecting Toggle CDI from the Pilot Display menu.

Figure 19:
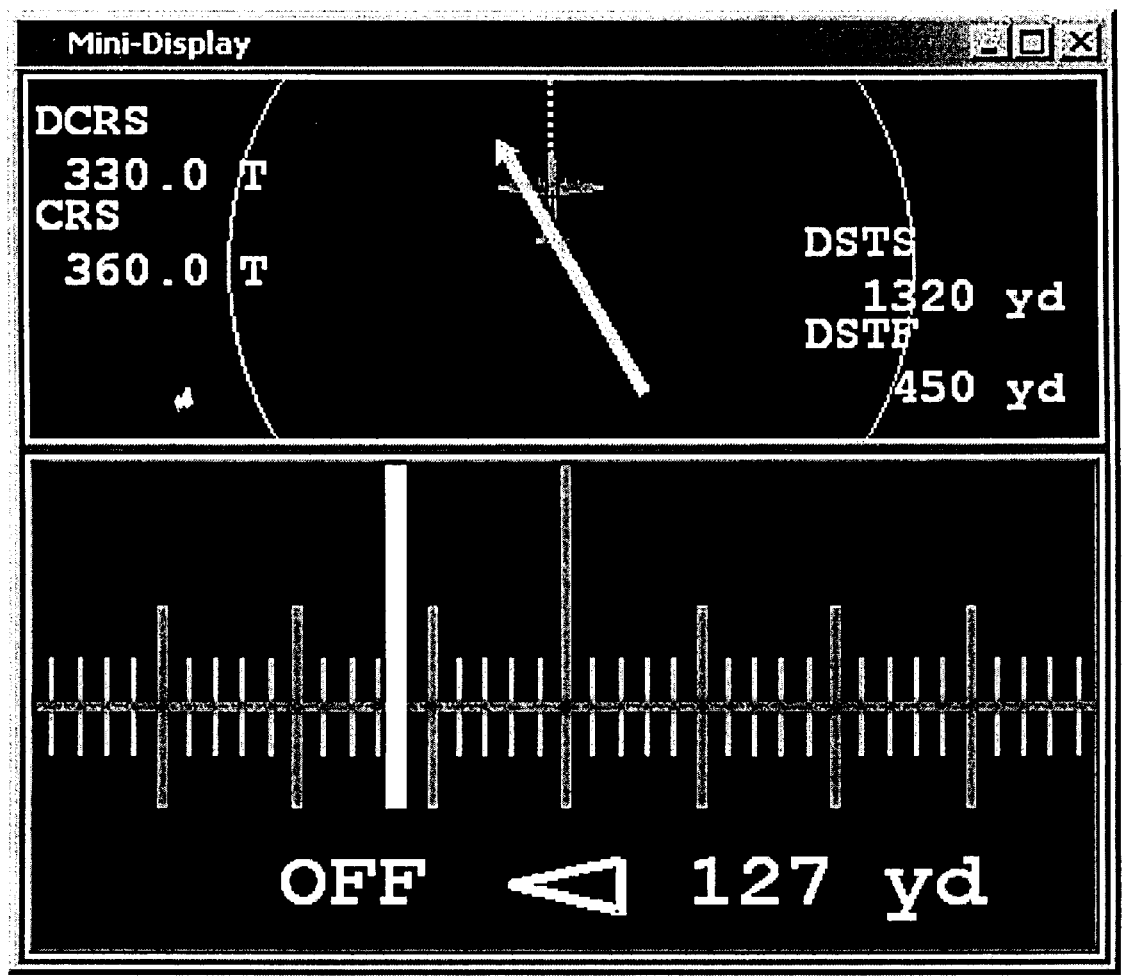
FIG. 19 illustrates the CDI display window.

The pilot display is comprised of a CDI in the lower half and a mini-map in the upper half of a window as shown in FIG. 19. The CDI indicates the perpendicular distance from the survey track to the aircraft's current position. The ticks on this display occur every 100 yards, with larger ticks every 500 yards. It has three automatic zoom resolutions: 400 yards, 1000 yards, and 5000 yards. The CDI operates in fly-to mode if the aircraft indicator is to the left of center, a left turn will be required to get back on line. The mini map indicates the position of the aircraft with respect to its desired flight path. The icon represents the aircraft orientation with respect to true north. The dotted line from the nose indicates its projected course. The line in the middle of the map represents the desired flight line. The circle indicates scale (the mini-map is auto-zooming), and represents a one nautical mile radius around the center of the flight line. Around the edges of the map are numerical readouts of the Distance to Start (DSTS), Distance to Finish (DSTF), Desired Course (DCRS), and Actual Course (CRS).

Figure 20:
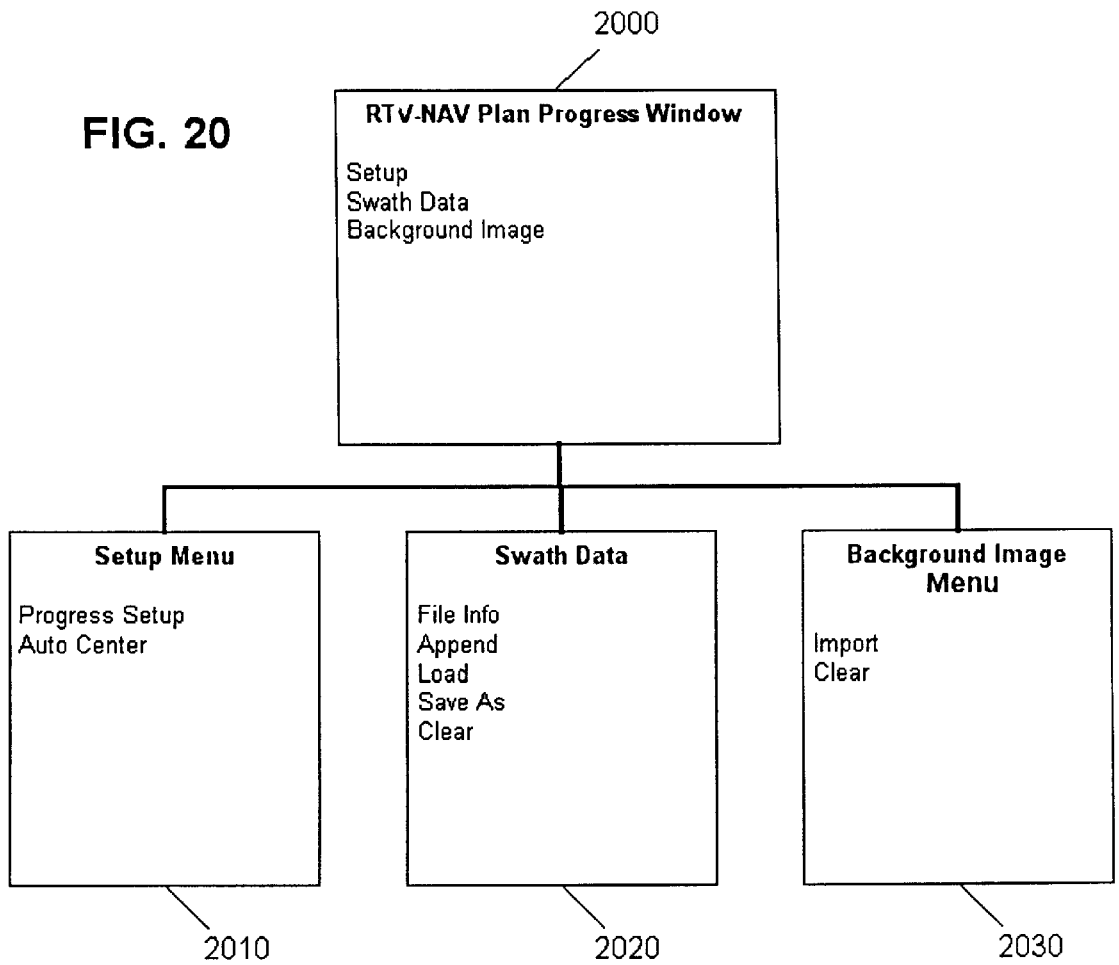
FIG. 20 illustrates a menu hierarchy for the plan progress interface.

Another operator display in the RTV-NAV system is the plan progress display. A menu hierarchy diagram for the plan progress window is shown in FIG. 20. It includes the RTV-NAV Plan Progress window 2000 having three menu selections. One is a Setup menu 2010. Another is a Swath Data menu 2020. The third is a Background Image menu 2030.

Figure 21:
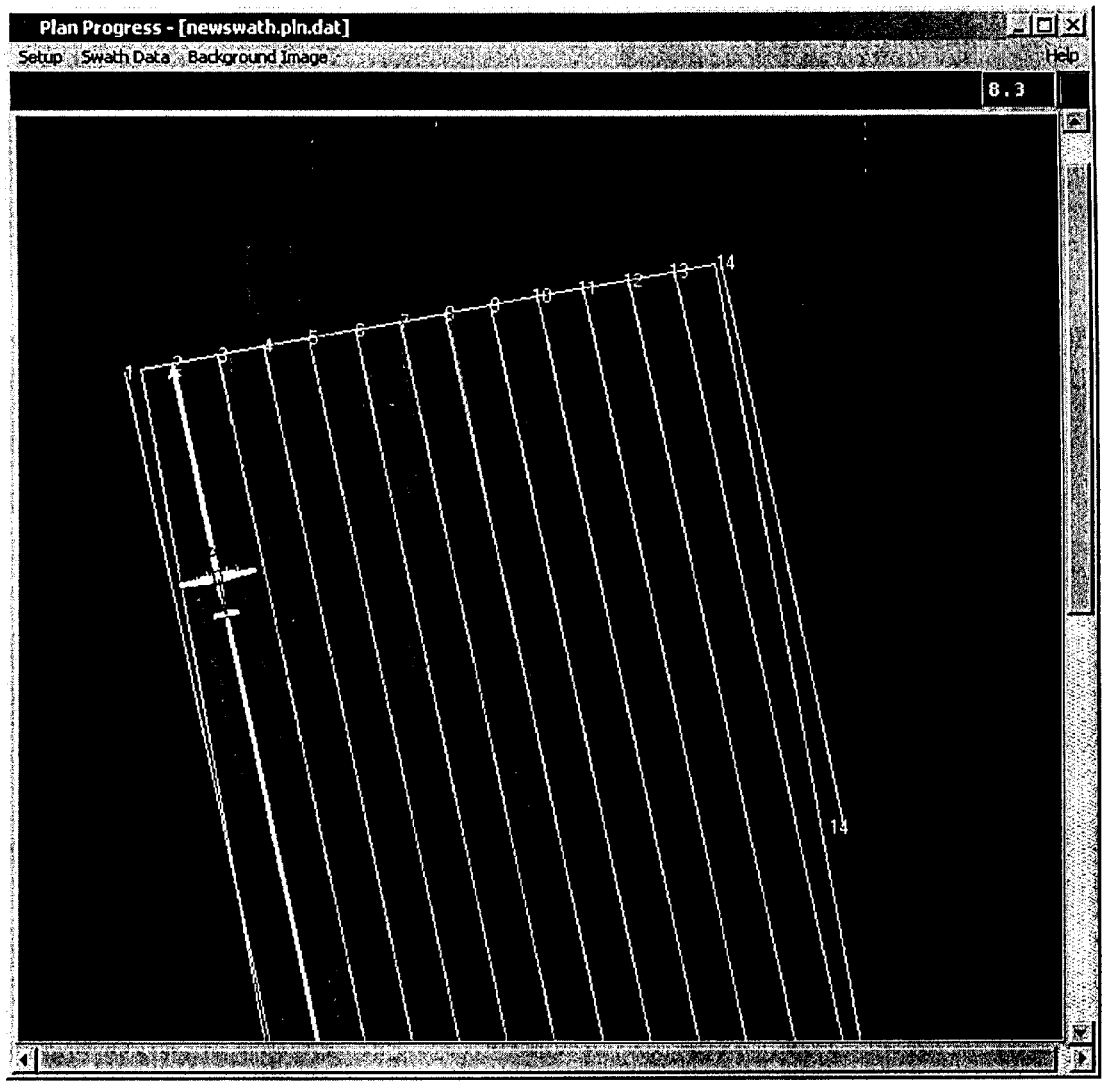
FIG. 21 illustrates the plan progress display window.
Figure 22:
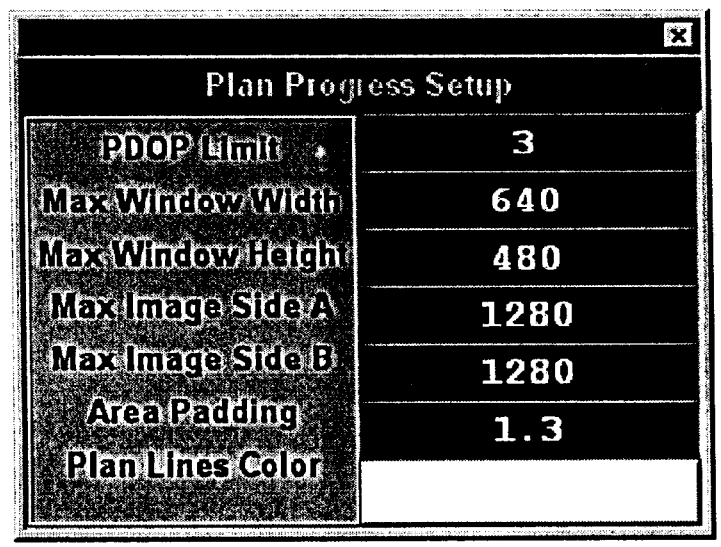
FIG. 22 illustrates the Plan Progress Setup Window.
Figure 23:
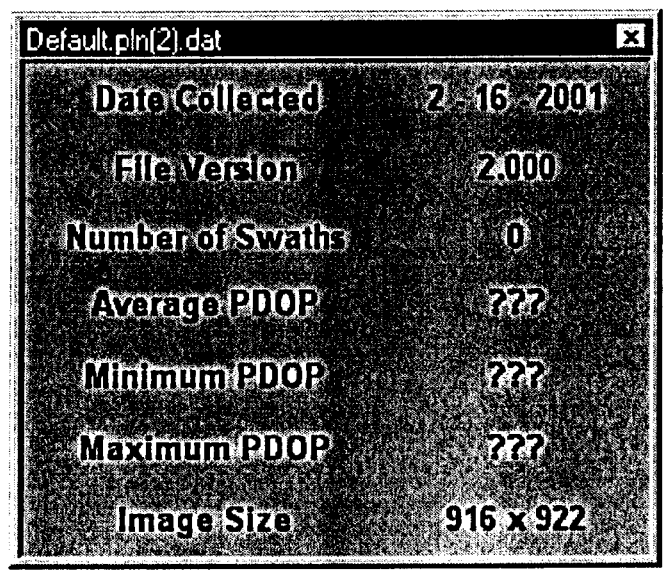
FIG. 23 illustrates the File Info window.

The plan progress window, shown in FIG. 21, provides a real-time graphical representation of the coverage quality of a survey flight. It shows numbered lines representing the currently defined survey plan, a large yellow arrow representing the currently selected pass, and an icon representing the aircraft. When the LIDAR laser is on, it will trace a path behind the aircraft indicating the estimated coverage of the LIDAR module based upon the real-time aircraft position and orientation and the LIDAR configuration. LIDAR roll compensation will be taken into account if it is active. If the GPS solution is good (as defined by a PDOP less than the user-defined maximum and an SVT greater than 5), the trace is green. If these GPS quality criteria are not met, the trace is red. The PDOP warning level may be altered by selecting Progress Setup from the Setup menu 2010 in the plan progress window of FIG. 22. Selecting File Info from the Swath Data menu opens a window, as shown in FIG. 23, containing data pertaining to the current flight plan.

Clicking with the mouse on the center of a bad coverage area (either red due to poor GPS or black due to aircraft maneuvering) displays the pass number that must be flown to fill in the gap. A fractional pass number, such as 5.5, indicates that a new line should be flown halfway between (in this case) pass 5 and pass 6. Internally, RTV-NAV defines flight lines by using the line spacing and extrapolating from line 1. This means that no additional measures beyond entering a pass number are needed to add new lines to an existing plan.

RTV-NAV stores swath data in swath files to enable accurate zooming and post-flight reconstruction and manipulation of plan progress views. These files contain outline coordinates and PDOP values recorded using real-time data. Whenever a flight plan is loaded, a new swath data file is opened to record any subsequent swaths. If a currently existing swath data file is then loaded by selecting Load from the Swath Data menu, additional swaths will instead be appended to the new active file. The name of the active file (the file to which swaths will be appended) is always listed-in the title bar of the plan progress view. Swath data files may be merged (if, for example separate files are recorded for separate flights over the same area) by selecting the Append Swath Data from the Swath Data menu. First, load the swath data file to which additional data is to be appended. Then, use the Append feature and select the desired data file to import. The swath data in the selected file will be permanently added to the active swath file. If it is desired to merge two or more swath files into a new file, first create the new file (by loading a flight plan) and then append both desired data sets.

Images other than the default black (such as a coverage map of the previous day's collect generated by post-processing software) may be shown behind the flight lines and swaths in the plan progress display utilizing the Background Image menu bar. Select Import from the Background Image menu, and select a desired image file. You will then be prompted to define control points to properly position and scale the image. This is done in the same manner as for images imported to the navigation map. Select Clear from the Background Image menu to return to the default black background.

The amount of area surrounding the actual survey grid shown in the plan progress window is determined by the size of the window when a plan is loaded or a when new zoom is selected. This extra area is limited, however, by several user-defined constants. Upon selecting "Progress Setup" from the Setup menu five constants labeled Max Window Width, Max Window Height, Max Image Side A, Max Image Side B, and Area Padding appear. The Max Window variables determine the maximum size to which the plan progress window may be expanded. The Max Image variables determine the maximum size of the scrollable image displayed within the window—including the survey grid and its surrounding area. This is used to prevent the user from overloading the computer by creating extremely large images. These values also are used to determine the maximum zoom value plan progress will accept. The fifth variable, Area Padding, is used to define the minimum area around the defined survey area to include in the image. It is defined as a multiplier to the size of the survey area, such that—for example—a value of 1.5 would result in 50% padding along the sides and top of the survey area. Normally, enough area to fill the current display window is added upon loading or zooming a flight plan. If this would result in less additional area than that specified by the Area Padding value, the Area Padding value is used instead.

The RTV-NAV primary control interface provides a wide array of capabilities for the airborne system operator while minimizing the complexity of operation. The RTV-NAV primary control interface display of FIG. 3 includes frames for instrument controls, GPS readouts, and a navigation map. A plan progress display, shown on another system operator display window, shows real-time area coverage of the mapping system. In addition, a pilot CDI display provides video data to assist the pilot(s) in following desired flight plans precisely. The pilot CDI display is not visible to the system operator but scan-converted to video for display in the cockpit.

FIG. 3 illustrates the primary RTV-NAV control interface display as seen by a system operator. A control panel frame is located on the left side of the RTV-NAV primary interface display and includes sections pertaining to GPS data, LIDAR controls, and flight plan data The GPS data display shows the current GPS time, altitude, speed, and position (latitude and longitude). It also indicates a position dilution of precision (PDOP) and satellites visible tracked (SVT) of the current GPS solution. When the PDOP rises above a user-defined maximum, it will be displayed in yellow-on-red instead of cyan-on-black. Similarly, the SVT will be displayed in yellow-on-red when less than six satellites are being tracked.

A window displaying additional GPS quality indicators may be opened by selecting Monitor GPS from the GPS Mode menu. The three instruments underneath the GPS data readouts indicate the roll (with the instrument depicting the view from the tail), pitch (with the instrument depicting a side view with the nose to the left), and heading/course (True) of the air-craft. For the heading/course instrument, the red needle indicates heading; and the white needle indicates course. Left-clicking the mouse pointer on this instrument will display a numerical readout of these values.

The LIDAR Controls frame provides a LASER ON/OFF button, LIDAR status virtual light emitting diodes (LEDs), LIDAR scan setting displays, a LIDAR tape indicator, and an RTV-NAV message readout. The LASER ON/OFF button activates and deactivates the laser when clicked upon. When the laser is active, the button will be red-and-yellow, as opposed to gray-and-black when the laser is off. The LIDAR Status LEDs indicate the operational state of the laser. The four virtual LED's (labeled "PW," "IX," "RX," and "EM") indicate the status of the laser power, transmit shutter, receive shutter, and laser emission. The scan setting displays show-the current scan width (SCNW) and scan frequency (SCNF). If these values differ from those detailed in the current flight plan, they will be displayed in yellow-on-red.

The tape meter, located just below the scan setting displays, provides a measure of how much data has currently been recorded. It will appear green until the tape is 50% fill, yellow from 50% to 80%, and red above 80%. At the right end of the tape meter is an "Eject" button for the data tape. Located below the tape meter, the RTV-NAV message readout reports status messages from the LIDAR unit.

Clicking on the LIDAR Controls header will open an interactive window allowing the LIDAR to be reconfigured. Selecting Configure ALTM from the LIDAR menu will accomplish the same task. The LIDAR configuration window displays two sets of values and three buttons. The first values, labeled Current are those currently programmed in the LIDAR. The second set, labeled Desired are editable. Enter the desired values in these fields and press Apply to program them into the LIDAR. There will be a few seconds delay as the RTV-NAV system processes the request, and then the LIDAR displays in the main interface will reflect the new settings.

To load the values appropriate for the currently loaded flight plan, click Load Plan Values. The scan width and scan frequency in the desired column will be changed to those in the Flight Plan. Clicking Apply will then program them into the LIDAR. If any flight plan is loaded on a computer connected to the RTV-NAV system, these values will be configured automatically. The SCNW and SCNF displays in the main interface will always be colored in yellow-on-red if the plan configuration values do not match the current RTV-NAV values. The Roll Compensator value indicates whether or not the RTV-NAV automated roll-compensation feature will be used. This feature corrects for aircraft roll by biasing the scanning of the laser. When automated roll-compensation is in use, a stair-step resulting from aircraft roll between updates will be noticeable at the very edges of the swaths in the processed data. The effect is normally too small to be visible in the plan progress display, and the benefits in platform stability are such that this option should almost always be active.

Selecting Monitor ALTM from the LIDAR menu allows monitoring of some of the more esoteric LIDAR operating statistics during operation. The ranges and intensities listed at the top of the window are random 1-Hz samples of the collected data. The "%Drops" is the dropout rate or percentage of pulses that falls below the "no return" threshold. This should be very close to zero in normal operating conditions.

The Flight Plan controls allow selection of an active flight line from the current flight plan. The active flight line is used to configure the pilot CDI and the plan progress window. The Passes readout displays the total number of lines in the current flight plan while the Current display shows the currently selected line. The Current display provides arrow buttons to step through flight lines one at a time and also allows a desired line number to be entered manually. If a line number is entered that is not defined in the current plan, a corresponding line is extrapolated. For example, if 1.5 is entered as a line number, a line is configured half-way between the predefined lines 1 and 2. The Heading readout gives the heading of the current active line, and the Reverse Tracks button may be used to reverse this heading. The View Waypoints button displays the endpoints of the current flight line. Clicking on the flight plan header opens the survey adjuster window.

The navigation map 315 illustrated in FIG. 3 is the largest portion of the primary RTV-NAV control interface display window. It provides a real-time graphical representation of a mission mapped onto a 1984 world geodetic system (WGS-84) projection of the surface of the earth. The aircraft is represented by a small icon, which may be configured to resemble a variety of aircraft. The current flight plan is also drawn on the map, as is latitude and longitude lines and a circle representing the current limits of the visible horizon.

The user may interact with the navigation map in several ways. If CTRL is held and the mouse is left-clicked on any point in the map, a small box will display the coordinates of the selected position. If SHIFT is held and the mouse is left-clicked-and-dragged, a box will be created displaying the length and bearing of the selected path.

A zoom control is located above the upper left-hand corner of the navigation map. It serves as a magnification factor, such that the larger the zoom factor the smaller the area displayed in the navigation map window. On a standard 1024×768 resolution screen, with the NAV application maximized, a zoom of 1.0 yields a viewing area a little greater than 1 degree by 1 degree.

In addition to the provided scrollbars, the navigation map may also be panned using the keyboard arrow keys. Pressing an arrow key will pan the navigation map a small amount in the corresponding direction. Holding an arrow key down will continuously pan the navigation map, while pressing CTRL with an arrow key will pan the navigation map one full page in the corresponding direction.

The LIDAR module includes an eye-safe altitude cutoff feature that automatically shuts off the laser whenever more than a few returns are received indicating that the altitude is less than a predefined limit. RTV-NAV automatically sets this limit to an altitude cutoff of 1212 meters if the scan angle is greater than 1° and 2194 meters otherwise. Additionally, RTV-NAV monitors the statistics of the scanner angles reported by the LIDAR module during data collection. If it appears that the laser is not scanning properly, RTV-NAV issues a shutdown order and informs the operator that there is a potential hardware problem.

There are several advantages associated with the present invention. RTV-NAV's flight planning capabilities maximize collection efficiency by determining the minimum number and configuration of flight lines necessary to cover a given area. The graphical nature and ease-of-use of the planner allow users to tweak flight plans as desired to obtain optimal results without needing to be fully aware of complex inter-relationships between the flight dynamics and LIDAR settings. The flight accuracy allowed by use of the Pilot Display CDI maximizes adherence to this flight plan during the collect, minimizing the number of lines which must be reflown. The progress tracking capabilities of the system alert the operators to holes and missed areas immediately in flight, whereas without this capability hours of post-processing on the ground after the flight are required to glean the same information. Finally, the simple, graphical nature of the system allows it to be operated by users with far less training and experience than would otherwise be required.

It is to be understood that the present invention illustrated herein is readily implementable by those of ordinary skill in the art as a computer program product having a medium with computer program(s) embodied thereon. The computer program product is capable of being loaded and executed on the appropriate computer processing device(s) in order to carry out the method or process steps described. Appropriate computer program code in combination with hardware implements many of the elements of the present invention. This computer code is typically stored on removable storage media. This removable storage media includes, but is not limited to, a diskette, standard CD, pocket CD, zip disk, or mini zip disk. Additionally, the computer program code can be transferred to the appropriate hardware over some type of data network.

The present invention has been described, in part, with reference to flowcharts or logic flow diagrams. It will be understood that each block of the flowchart diagrams or logic flow diagrams, and combinations of blocks in the flowchart diagrams or logic flow diagrams, can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks or logic flow diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart blocks or logic flow diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart blocks or logic flow diagrams.

Accordingly, block(s) of flowchart diagrams and/or logic flow diagrams support combinations of means for performing the specified functions, combinations of steps for performing the specified functions and program instruction means for performing the specified functions. It will also be understood that each block of flowchart diagrams and/or logic flow diagrams, and combinations of blocks in flowchart diagrams and/or logic flow diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A computer readable medium whose contents transform a computer system into an aerial survey system, comprising:
    a survey planner subsystem for generating an aerial survey flight plan;
    a flight management subsystem for monitoring and controlling a GPS data module, an inertial navigation module, and a LIDAR module;
    a coverage evaluation subsystem for monitoring the coverage quality of an aerial survey flight; and
    a graphical user interface subsystem viewable on a system display, said graphical user interface subsystem for controlling said survey planner subsystem, said flight management subsystem, and said coverage evaluation subsystem.

2. The computer readable medium of claim 1 wherein said aerial survey flight plan is comprised of a survey area, a survey resolution, and a flight profile, said flight profile including a survey flight altitude, a survey flight velocity, an overlap value, and a turn time.

3. The computer readable medium of claim 2 wherein said survey planner subsystem can be used to alter said flight plan during a flight via said graphical user interface subsystem.

4. The computer readable medium of claim 2 wherein said coverage evaluation subsystem highlights successfully covered areas and unsuccessfully covered areas of a survey area on said system display in real-time.

5. The computer readable medium of claim 4 wherein said flight management subsystem can program a new flight line into the flight plan during a flight in order to cover areas that were previously unsuccessfully covered.

6. The computer readable medium of claim 1 further comprising a calibration flight planning subsystem for calibrating the LIDAR module.

7. The computer readable medium of claim 1 wherein said graphical user interface subsystem is a menu-driven windows based software program.

8. The computer readable medium of claim 7 wherein graphical user interface subsystem includes a primary control interface window comprised of:
    a menu bar that is used to navigate among and select program options;
    a control panel that is used to monitor system parameters; and a navigation map that is used to view the current flight plan.

9. The computer readable medium of claim 8 wherein system parameters include GPS data, inertial navigation data, LIDAR control data, and flight plan data.

10. The computer readable medium of claim 9 wherein one of the selectable program options includes a flight plan load option that can load a flight plan, calculate and display a set of flight lines on said navigation map and configure said LIDAR module according to the flight plan.

11. The computer readable medium of claim 7 wherein said graphical user interface subsystem includes a plan progress display window that is used to highlight successfully covered areas and unsuccessfully covered areas of a survey area on said system display in real-time.

12. The computer readable medium of claim 7 wherein said graphical user interface subsystem can control an aircraft cockpit display, said aircraft cockpit display for showing, with respect to a flight plan, course deviation data to a pilot during a flight.

13. A computer system for planning and conducting an aerial survey, comprising:
    an aircraft mountable rapid terrain visualization module comprised of inertial navigation measuring equipment for measuring aircraft flight data, GPS data equipment for measuring aircraft position data, and LIDAR equipment for tracing a laser swath over a specified area of terrain in order to obtain geographical information for said specified area;
    a computer operably connectable with said aircraft mountable rapid terrain visualization module such that said computer receives data from said rapid terrain visualization module;
    a display operably connectable with said computer such that data received from said rapid terrain visualization module can be viewed on said display; and
    a graphical user interface running on said computer, said graphical user interface capable of launching a plan progress display window that is used to highlight successfully covered areas and unsuccessfully covered areas of a survey area on said system display in real-time during a flight.

14. The computer system of claim 13 wherein said computer is further operably connectable with data storage means such that data received from said rapid terrain visualization module can be stored in said data storage means for subsequent analysis and post processing.

15. The computer system of claim 14 wherein said computer can be disconnected from said rapid terrain visualization module once data from said rapid terrain visualization module has been received and stored.

16. The computer system of claim 15 wherein said computer is used to generate a flight plan for surveying a desired area.

17. The computer system of claim 16 wherein said computer need not be connected to said rapid terrain visualization module in order to generate said flight plan.

18. The computer system of claim 17 wherein said flight plan is comprised of a survey area, a survey resolution, and a flight profile, said flight profile including a survey flight altitude, a survey flight velocity, an overlap value, and a turn time.

19. The computer system of claim 18 wherein said flight plan is stored in said data storage means.

20. The computer system of claim 19 wherein said graphical user interface is a windows based menu-driven software program.

21. The computer system of claim 20 wherein said graphical user interface includes a primary control interface window comprised of:
    a menu bar that is used to navigate among and select program options;
    a control panel that is used to monitor system parameters; and a navigation map that is used to view the current flight plan.

22. The computer system of claim 21 wherein system parameters m dude GPS data, inertial navigation data, LIDAR control data, and flight plan data.

23. The computer system of claim 20 wherein said computer can switch said LIDAR equipment on and off via said graphical user interface.

24. The computer system of claim 20 wherein said computer is operably connectable with an aircraft cockpit display, said aircraft cockpit display for showing, with respect to a flight plan, course deviation data to a pilot during a flight.

25. The computer system of claim 24 wherein said aircraft cockpit display is controllable via said graphical user interface.

26. The computer system of claim 16 wherein said computer can alter said flight plan during a flight via said graphical user interface in response to unsuccessfully covered areas highlighted on said plan progress display.

27. A computer system for planning an aerial survey that is comprised of a computer running a windows based menu-driven graphical user interface responsive to operator input that is used to generate a flight plan for surveying a designated area, wherein said flight plan is comprised of a survey area, a survey resolution, and a flight profile, said flight profile including a survey flight altitude, a survey flight velocity, an overlap value, and a turn time, said computer system also comprising data storage means for storing said flight plan and means for evaluating the quality of coverage of an aerial survey flight.

28. The computer system of claim 27 wherein said data storage means is removable from said computer system and operable with other computer systems.

29. The computer system of claim 27 wherein said data storage means is a removable compact disk that can store a flight plan and can transfer said flight plan to another computer system.

30. The computer system of claim 27 wherein said data storage means is a removable floppy disk that can store a flight plan and can transfer said flight plan to another computer system.

31. The computer system of claim 27 wherein said data storage means is a removable zip disk that can store a flight plan and can transfer said flight plan to another computer system.

32. The computer system of claim 27 wherein said flight plan can be transferred to another computer system via a network connection.

* * * * *

UNITED STATES PATENT AND TRADEMARK OFFICE
CERTIFICATE OF CORRECTION

PATENT NO. : 6,711,475 B2
DATED : March 23, 2004
INVENTOR(S) : Kevin E. Murphy

It is certified that error appears in the above-identified patent and that said Letters Patent is hereby corrected as shown below:

Column 1,
Line 7, delete "60/189,827" and insert therefor -- 60/189,817 --.
Line 8, before "BACKGROUND OF THE INVENTION", insert
-- STATEMENT OF GOVERNMENT INTEREST
This invention was made with Government support under Contract No. N00024-97-C-8124 awarded by the Department of the Navy and Contract No. DAB07-96-D-A257 awarded by the Department of the Army. The Government has certain rights in the invention. --

Column 19,
Line 4, delete "m dude" and substitute therefor -- include --.

Signed and Sealed this

Fifteenth Day of June, 2004

JON W. DUDAS
*Acting Director of the United States Patent and Trademark Office*